US011079250B2

(12) United States Patent
Droege et al.

(10) Patent No.: US 11,079,250 B2
(45) Date of Patent: Aug. 3, 2021

(54) OPTIMIZATION OF NETWORK SERVICE BASED ON AN EXISTING SERVICE

(71) Applicant: Uber Technologies, Inc., San Francisco, CA (US)

(72) Inventors: Jason Droege, San Francisco, CA (US); Stephen Chau, Palo Alto, CA (US); Andrew Timothy Szybalski, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 120 days.

(21) Appl. No.: 16/589,495

(22) Filed: Oct. 1, 2019

(65) Prior Publication Data

US 2020/0033156 A1 Jan. 30, 2020

Related U.S. Application Data

(63) Continuation of application No. 15/728,268, filed on Oct. 9, 2017, now Pat. No. 10,458,808.

(60) Provisional application No. 62/442,280, filed on Jan. 4, 2017.

(51) Int. Cl.
*G01C 21/36* (2006.01)
*G06Q 50/12* (2012.01)
(Continued)

(52) U.S. Cl.
CPC ..... *G01C 21/3679* (2013.01); *G01C 21/3605* (2013.01); *G06F 16/951* (2019.01);
(Continued)

(58) Field of Classification Search
CPC ............... G01C 21/36; G01C 21/3679; G01C 21/3605; G06F 16/951; G06Q 10/0834;
(Continued)

(56) References Cited

U.S. PATENT DOCUMENTS 6,862,572 B1 3/2005 de Sylva
7,676,404 B2 3/2010 Richard
(Continued)

FOREIGN PATENT DOCUMENTS

CN 104751272 7/2015
KR 10-2014-0016053 2/2014
(Continued)

OTHER PUBLICATIONS

PreExam Office Action in BR 1120170221314 dated Jun. 16, 2020.
(Continued)

*Primary Examiner* — Tan Q Nguyen
(74) *Attorney, Agent, or Firm* — Mahamedi IP Law LLP

(57) ABSTRACT

A network system can receive, from a user device of a requesting user, a query related to a first service. If the network system determines that a first service provider is in progress of providing a second service for the requesting user, the network system can identify, based on a service location of the second service, a plurality of entities that provide items available for selection in association with the first service. The network system can further determine whether to select the first service provider to fulfill the request for the first service based on an estimated first service duration associated with the first service and an estimated duration remaining for the second service. The first service duration can be estimated based on respective timing information associated one or more items selected by the requesting user. The network system can update a route for the first service provider.

20 Claims, 7 Drawing Sheets

(51) Int. Cl.
*G06F 16/951* (2019.01)
*G06Q 10/06* (2012.01)
*G06Q 10/08* (2012.01)
*G06Q 30/06* (2012.01)

(52) U.S. Cl.
CPC . *G06Q 10/063114* (2013.01); *G06Q 10/0834* (2013.01); *G06Q 10/08355* (2013.01); *G06Q 50/12* (2013.01); *G01C 21/36* (2013.01); *G06Q 30/0605* (2013.01)

(58) Field of Classification Search
CPC .. G06Q 10/08355; G06Q 50/12; G06Q 50/30; G06Q 30/0605
See application file for complete search history.

(56) References Cited

U.S. PATENT DOCUMENTS

| | | | |
|---|---|---|---|
| 7,826,607 B1 * | 11/2010 | de Carvalho Resende | H04M 3/22 379/225 |
| 8,244,645 B2 | 8/2012 | Malitski | |
| 8,315,802 B2 | 11/2012 | Brown | |
| 8,860,587 B2 | 10/2014 | Nordstrom | |
| 8,880,427 B1 | 11/2014 | Jones | |
| 9,684,627 B1 | 6/2017 | Sar | |
| 9,754,331 B1 | 9/2017 | Beckelman | |
| 9,993,735 B2 | 6/2018 | Aghdaie | |
| 10,026,055 B2 | 7/2018 | Riel-Dalpe | |
| 10,133,995 B1 | 11/2018 | Reiss | |
| 10,156,449 B2 | 12/2018 | Colijin | |
| 10,308,430 B1 | 6/2019 | Brady | |
| 10,360,616 B2 | 7/2019 | Lopez | |
| 10,366,434 B1 | 7/2019 | Belousova | |
| 10,467,562 B1 | 11/2019 | Mo | |
| 10,467,563 B1 | 11/2019 | Mo | |
| 10,586,273 B1 | 3/2020 | Kohli | |
| 2001/0047285 A1 | 11/2001 | Borders | |
| 2002/0152128 A1 | 10/2002 | Walch | |
| 2003/0040944 A1 | 2/2003 | Hileman | |
| 2004/0030572 A1 | 2/2004 | Campbell | |
| 2004/0122735 A1 * | 6/2004 | Meshkin | G06Q 30/0226 705/14.27 |
| 2004/0260470 A1 | 12/2004 | Rast | |
| 2005/0209913 A1 | 9/2005 | Wied | |
| 2006/0136237 A1 | 6/2006 | Spiegel | |
| 2007/0033087 A1 | 2/2007 | Combs | |
| 2007/0150375 A1 | 6/2007 | Yang | |
| 2008/0046326 A1 | 2/2008 | Horstemeyer | |
| 2008/0195428 A1 | 8/2008 | O'Sullivan | |
| 2009/0048890 A1 | 2/2009 | Burgh | |
| 2010/0153279 A1 | 6/2010 | Zahn | |
| 2011/0082704 A1 * | 4/2011 | Blum | A61B 3/0285 705/2 |
| 2011/0258134 A1 | 10/2011 | Mendez | |
| 2012/0059693 A1 | 3/2012 | Colodny | |
| 2012/0203619 A1 | 8/2012 | Lutnick | |
| 2012/0253878 A1 | 10/2012 | Forstall | |
| 2012/0323642 A1 | 12/2012 | Camp | |
| 2013/0073327 A1 | 3/2013 | Edelberg | |
| 2013/0218727 A1 | 8/2013 | Lutnick | |
| 2014/0026054 A1 | 1/2014 | Wang | |
| 2014/0058902 A1 | 2/2014 | Taylor | |
| 2014/0108201 A1 | 4/2014 | Franchette | |
| 2014/0129302 A1 | 5/2014 | Amin | |
| 2014/0129951 A1 | 5/2014 | Amin | |
| 2014/0164126 A1 | 6/2014 | Nicholas | |
| 2014/0172739 A1 | 6/2014 | Anderson | |
| 2014/0188750 A1 | 7/2014 | Seiler | |
| 2014/0214465 A1 | 7/2014 | L'Heureaux | |
| 2014/0229099 A1 | 8/2014 | Garrett | |
| 2014/0278635 A1 | 9/2014 | Fulton | |
| 2014/0370167 A1 | 12/2014 | Garden | |
| 2015/0142640 A1 | 5/2015 | Kneen | |
| 2015/0154538 A1 | 6/2015 | Skaaksrud | |
| 2015/0204684 A1 | 7/2015 | Rostamian | |
| 2015/0223024 A1 | 8/2015 | Abuodeh | |
| 2015/0227980 A1 | 8/2015 | Eberhardt | |
| 2015/0248689 A1 | 9/2015 | Paul | |
| 2015/0310379 A1 | 10/2015 | Farrelly | |
| 2015/0323332 A1 | 11/2015 | Lord | |
| 2015/0323333 A1 | 11/2015 | Lord | |
| 2015/0323334 A1 | 11/2015 | Lord | |
| 2015/0324734 A1 | 11/2015 | Lord | |
| 2015/0324735 A1 | 11/2015 | Lord | |
| 2015/0324944 A1 | 11/2015 | Lord | |
| 2015/0347964 A1 | 12/2015 | Taylor | |
| 2016/0012391 A1 | 1/2016 | Burnett | |
| 2016/0019496 A1 | 1/2016 | Gorlin | |
| 2016/0027079 A1 | 1/2016 | Schoeffler | |
| 2016/0034845 A1 | 2/2016 | Hiyama | |
| 2016/0035248 A1 | 2/2016 | Gibbs | |
| 2016/0042303 A1 | 2/2016 | Medina | |
| 2016/0078516 A1 | 3/2016 | Alnuwaysir | |
| 2016/0104112 A1 | 4/2016 | Gorlin | |
| 2016/0104113 A1 | 4/2016 | Gorlin | |
| 2016/0132792 A1 | 5/2016 | Rosnow | |
| 2016/0148306 A1 | 5/2016 | Bellavance | |
| 2016/0171439 A1 | 6/2016 | Ladden | |
| 2016/0171542 A1 | 6/2016 | Fanous | |
| 2016/0171584 A1 | 6/2016 | Cao | |
| 2016/0307289 A1 | 10/2016 | Choksi | |
| 2016/0328669 A1 | 11/2016 | Droege | |
| 2017/0024789 A1 | 1/2017 | Frehn | |
| 2017/0093803 A1 | 3/2017 | Nayshtut | |
| 2017/0270794 A1 | 9/2017 | Sweeney | |
| 2017/0290345 A1 | 10/2017 | Garden | |
| 2018/0025298 A1 | 1/2018 | Baggott | |
| 2018/0067620 A1 | 3/2018 | Adler | |
| 2018/0188068 A1 | 7/2018 | Droege | |
| 2018/0189729 A1 | 7/2018 | Droege | |
| 2018/0202818 A1 | 7/2018 | Zhang | |
| 2018/0231984 A1 | 8/2018 | Alonso-Mora | |
| 2018/0253805 A1 | 9/2018 | Kelly | |
| 2018/0300660 A1 | 10/2018 | Coan | |
| 2018/0308038 A1 | 10/2018 | Zhou | |
| 2018/0336510 A1 | 11/2018 | DaCosta | |
| 2019/0026662 A1 | 1/2019 | Kring | |
| 2019/0035037 A1 | 1/2019 | Chase | |
| 2019/0064801 A1 | 2/2019 | Frazzoli | |
| 2019/0113361 A1 | 4/2019 | Droege | |
| 2019/0114583 A1 | 4/2019 | Ripert | |
| 2019/0130354 A1 | 5/2019 | Han | |
| 2019/0163710 A1 | 5/2019 | Haghighat Kashani | |
| 2019/0289427 A1 | 9/2019 | Lin | |
| 2020/0033156 A1 | 1/2020 | Droege | |
| 2020/0065734 A1 | 2/2020 | Szybalski | |
| 2020/0074524 A1 | 3/2020 | Smith | |
| 2020/0090248 A1 | 3/2020 | Zeng | |
| 2020/0151660 A1 | 5/2020 | Warr | |
| 2020/0160264 A1 | 5/2020 | Silverman | |
| 2020/0311618 A1 | 10/2020 | Eichler | |
| 2020/0333161 A1 | 10/2020 | Droege | |

FOREIGN PATENT DOCUMENTS

| | | |
|---|---|---|
| KR | 10-1371091 | 3/2014 |
| KR | 10-2014-0101501 | 8/2014 |
| KR | 10-2017005473 | 5/2017 |
| WO | WO 2001052163 | 7/2001 |
| WO | WO 2014-030976 | 2/2014 |
| WO | WO 2014-033559 | 3/2014 |
| WO | WO 2017/148202 | 9/2017 |
| WO | WO 2018/209263 | 11/2018 |

OTHER PUBLICATIONS

Mabe, John, The 'Uber-for-X Model' and the Complexity of On-Demand Delivery, Techgistics, Dec. 1, 2016.

Singliar, Tomas, Demand Forecasting for Shipping and Distribution, Azure AI Gallery, Jun. 26, 2017.

(56) References Cited

OTHER PUBLICATIONS

Chen, P., Crowdsourced Delivery for Last-Mile Distribution: An Agent-Based Modeling and Simulation Approach, IEEE, 2017.
IPRP dated Aug. 25, 2020 in PCT/US2019/051993.
ISR and Written Opinion in PCT/US2018/058554 dated Feb. 13, 2019.
ISR and Written Opinion in PCT/US2018/058859 dated Feb. 20, 2019.
Reutt, Alex "Deliveroo Frank About Improved Algorithm Improving Service Times by 31%", Oct. 17, 2017 (https://www.itwire.com/home-it/80398-deliveroo-frank-about-improved-algorithm-improving-service-times-by-31.html).
Written Opinion in PCT/US2018/058859 dated Oct. 21, 2019.
IPRP dated Nov. 7, 2019 in PCT/US2018/058554.
ISR and Written Opinion in PCT/US2019/051993 dated Sep. 19, 2019.
HungryBBQ Delivery Details, Sep. 11, 2019 www.hungrybbq.com/delivery_info.php.
Eatzcatering FAQ, Nov. 13, 2018 www.eatzcatering.com.
Technological Disruption and Innovation in Last-Mile Delivery, Stanford Value Chain Innovation Initiative, Stanford, Jun. 2016.
Collaborative Urban Logistics: Synchronized Last-Mile Logistics for Sustainable, Efficient Urban Delivery, TLI Asia Pacific White Paper Series, vol. 13, Nov. 2013.
Grand Junction Local Delivery Reinvented—Last Mile Platform Help, Grand Junction Inc., PerfectLastMile.com, 2016.
Computerised Vehicle Routing and Scheduling (CVRS) for Efficient Logistics, Department for Transport, 2005.
ISR and Written Opinion in PCT/US2016/030690 dated Jul. 28, 2016.
IPER in PCT/US2016/030690 dated Nov. 16, 2017.

\* cited by examiner

OPTIMIZATION OF NETWORK SERVICE BASED ON AN EXISTING SERVICE

CROSS-REFERENCE TO RELATED APPLICATIONS

This application is a continuation of U.S. patent application Ser. No. 15/728,268, filed Oct. 9, 2017, which claims the benefit of U.S. Provisional Patent Application No. 62/442,280, filed Jan. 4, 2017, both of which priority applications are hereby incorporated by reference in their entireties.

BACKGROUND

A conventional network service may allow a requesting user to request service associated with a selection of one or more items from an entity to be fulfilled by a service provider. However, the requesting user is limited to selecting items offered by a single entity. In other words, the requesting user usually must first select an entity before selecting available items offered by that entity in connection with the service request. This may lead to an undesirable user experience.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
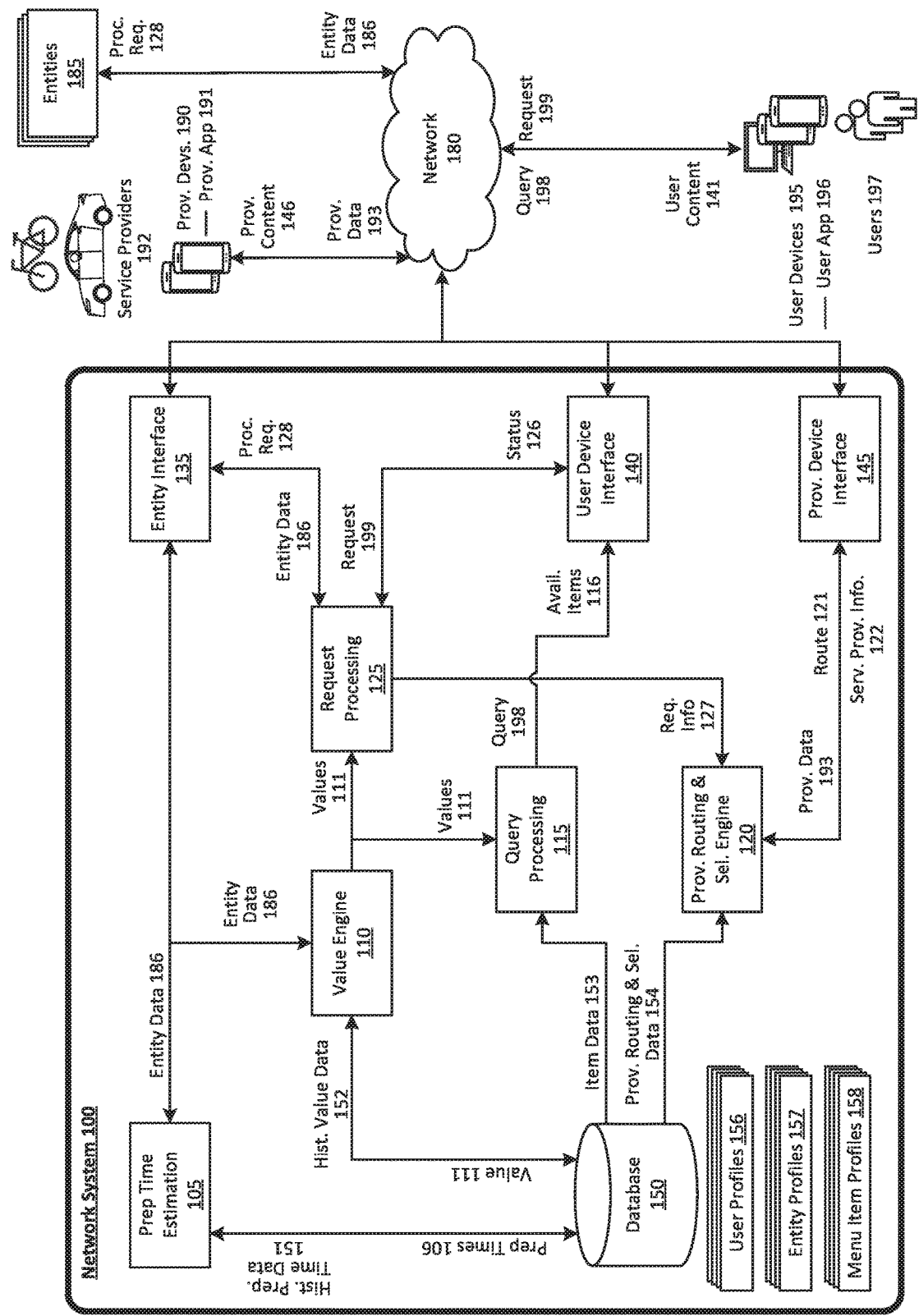
FIG. 1 is a block diagram illustrating an example network system for providing a network service over a given geographic region, in accordance with examples described herein.

A network service, which is implemented by a computer system(s) (referred to herein as a "network system" for purposes of simplicity), is provided herein that links service providers (e.g., drivers, couriers, autonomous vehicles (AVs), etc.) with requesting users throughout a given geographic region (e.g., a metroplex such as the San Francisco Bay Area). In doing so, the network service communicates with a pool of service providers over the given geographic region, each operating a vehicle for providing services and one or more computing devices ("service provider devices" or "provider devices"). The network system receives requests for services (e.g., a transport service, a delivery service, etc.) from requesting users via a designated user or client application ("user application") executing on the users' mobile computing devices ("user devices"). In response, the network system identifies one or more available service providers to fulfill each user's request.

In various aspects, a query can be submitted from a user device of a requesting user. The query can include a desired service location determined using location data generated by the user device or inputted by the requesting user via the user application. In one example, the query can be submitted in response to the user launching or activating the user application. The query can also be submitted in response to the user's selection of a user interface feature (e.g., a soft selection feature for "Search" or "Submit"). In response, the network system can identify a plurality of available nearby entities (e.g., entities located within a predetermined distance from the service location, or within a specified region, etc.) and/or a number of available items offered by those entities. As referred to herein, an entity can correspond to an individual, a company, a group, a vendor or merchant, etc., that provides one or more goods or items for sale (e.g., a chef, a baker, a restaurant, a café, a store, etc.). The user device can also transmit data corresponding to a request for service that includes the requesting user's selection of one or more selected items from the available items. In response, the network system can transmit data corresponding to selected items to each of a sub-set of the plurality of entities (e.g., entities that provide the one or more selected items). The network system can also select a service provider(s) to fulfill the request for service and determine a route for the selected service provider(s). In one example, the route can include route segments to the locations of each of the sub-set of entities (e.g., in a specified order) and a route segment to the service location. For example, the route can include a first route segment from a location (e.g., current location of the selected service provider) to the location of a first one of the sub-set of entities, a second route segment from the first one of the sub-set of entities to a second one of the sub-set of entities, etc. The route can further include a last route segment from the location of one of the sub-set of entities to the service location. Using the network service, a requesting user can view available items without the need to first select or be restricted to one particular entity from the plurality of nearby entities. The requesting user can also select items from multiple entities in a single request.

According to embodiments, the network system associates timing information or timing data (referred to herein as "preparation time(s)") with individual entities and/or with items offered by individual entities in the given geographic region in order to manage the network service within the given geographic region. In certain contexts, such as for food or restaurant vendors or merchants, a preparation time can include one or more of the following: (i) an estimated duration of time for someone to receive requests, (ii) an estimated duration of time for someone to process requests, (iii) an estimated duration of time for someone to gather ingredients for the selected items, (iv) an estimated duration of time for someone to prepare the selected items, or (v) an estimated duration of time for someone to ready the selected items for pickup by service providers. In other examples, the preparation times can include other durations of time (e.g., buffer times between the listed durations, etc.). The preparation times can be determined based on historical data. For instance, the network system can maintain, in one or more databases, historical records of the preparation times associated with each selected item and analyze the historical records (e.g., using statistical modeling, machine learning, etc.) to estimate or determine each item's preparation time. The preparation times can also be determined dynamically, and/or periodically, using real-time data received from the entities and/or based on the current date or time when the preparation times are determined. For example, the network system can receive, from an entity, real-time data regarding currently pending requests received by the entity to estimate or determine a preparation time associated with an item offered by the entity. Furthermore, the preparation times can be pre-determined using data collected through trial runs in preparing the offered items. For example, trial runs for one or more items can be conducted and preparation times can be measured and recorded based on the trial runs. The preparation times can also include anticipated or estimated delays associated with, for example, order backlogs at entities. In some examples, the preparation times can be adjusted based on estimated or anticipated demand (or current demand and/or number of requested placed during a duration of time) or other circumstances (e.g., a sporting event, weather conditions, etc.). For instance, the network system can adjust preparation times to take into account delays associated with expected backlogs of requests received by entities during high-demand periods.

In various examples, the network system receives a query from a user device operated by a requesting user to view available items (e.g., restaurant menu items) offered by a plurality of available entities. The query can include data regarding a service location. The service location can be determined based on geo-location data generated by the user device (e.g., GPS, GLONASS, or Galileo data etc.). The service location can also be inputted by the user through the user application or auto-populated based on historical data pertaining to the user (e.g., a home location, a favorite location, etc.). The network system can identify the plurality of available entities based on the service location (e.g., within a certain distance from the service location, within the same geographic region or sub-region as the service location, within a certain estimated time of travel from the service location, etc.). In examples herein, each entity can be associated with a location that the network system can access to determine whether an entity should be one that is available in response to a query or request.

In some examples, the network system can also identify available items for selection by the requesting user from items offered by the plurality of entities. The identification of available items can be based on preparation times associated with the offered items. As one example, the requesting user can enter a desired service time (e.g., a desired time for ordered items to arrive at the service location, such as now or in fifty minutes, etc.). The network system can identify a sub-set of the items offered by the plurality of entities as the available items based on the desired service time and estimated service durations (e.g., estimated time for an item to arrive at the service location). The estimated service durations can include, or be estimated based on, respective preparation times associated with the items. For instance, if an item can be prepared in time to arrive at the service location around (e.g., within a predefined window of time) or at the desired service time, the network system can identify the item as an available item. The identification of available items can also be based on factors such as inventory at the plurality of available entities (e.g., inventory of available raw materials or ingredients), user preferences and other profile information (e.g., food allergies), menu item information (e.g., information indicating that an item is unsuitable for travel time of longer than 20 minutes), etc. In doing so, the network system can identify and cause the user application to selectively display those available items that are particularly suitable for selection in response to the requesting user's query.

According to embodiments, the user device operated by the requesting user can receive content data corresponding to the available items and information related thereto (e.g., preparation times, values associated with the available items, entity information, user reviews, and ratings, etc.) from the network system. The user device can display one or more menus or lists of the available items for viewing and selection by the requesting user. In response to the requesting user's selection of one or more items, the user device can generate and transmit data corresponding to a request to the network system.

In various examples, the network system can receive the request data from a user device corresponding to the user's selection of one or more selected items from the available items. In response, the network system can process the request data, identify which items were selected, identify the appropriate entities (e.g., a sub-set of the plurality of available entities) that provide those items (e.g., using an identifier of the item and/or the identifier of the entity), and transmit information regarding the one or more selected items to the appropriate entities. Such information can allow the entities to begin preparing the one or more selected items. In addition, the network system can determine an optimal route for a service provider to take in fulfilling the requested service. The route can include route segments to each of the locations of the sub-set of entities (e.g., a first route segment from the current location of the selected service provider to a first one of the sub-set of entities, a second route segment from the first one of the sub-set of entities to a second one of the sub-set of entities, etc.) and a route segment to the service location (e.g., a last route segment from the last one of the sub-set of entities to the service location). The network system can determine the optimal route based on the respective preparation times associated with the one or more selected items. For instance, the network system can determine the optimal route such that the selected service provider arrives at an entity at or around the time when the entity is estimated to have finished preparing a corresponding selected item. Furthermore, the network system can determine an entity order (e.g., sequence of entities that the service provider is to travel to on the route) based on the preparation times of the one or more selected items. For instance, a first entity can be sequenced before a second entity based on the network system's determination that a first item(s) to be prepared by the first entity is estimated to be prepared before a second item(s) to be prepared by the second entity, based on the preparation times associated with the first and second items. The network system can also optimize the route based on travel time and/or travel distance. In doing so, the network system can minimize wait time by the service provider (e.g., waiting for items to be prepared at the respective entities locations) and by the requesting user. The network system can further leverage the respective preparation times of the one or more selected items to inform the service provider of an appropriate time to depart for the entities or to inform the service provider of an estimated wait time upon arriving at an entity. In various aspects, the network system can also determine the optimal route based on traffic information (e.g., historical traffic patterns, real-time traffic data, predicted traffic patterns, etc.).

According to embodiments, the network system can select a service provider(s) from a pool of service providers in the geographic region to fulfill the service request from the requesting user. The network system can communicate with provider devices operated by service providers to receive data including data regarding location (e.g., geo-location data generated by the provider device) and status (e.g., indicating whether a service provider is available to fulfill a service request). The network system can select a service provider to fulfill the service request based on service provider's location and status. For example, the network system can select a service provider that is located proximately (e.g., within a mile) to one or more entities and/or to the service location. The network system can also select a service provider based on a provider type associated with the service provider (e.g., automobile, motorcycle, bicycle, on-foot, etc.). For instance, the network system can select a service provider based on the service provider's provider type that is determined to particularly suit the service location, entity locations, and/or a route (or a portion thereof) determined by the network system (e.g., route to the entity locations and to the service location). For instance, if the service location, entity locations, and/or the route are located in a particularly dense urban environment, the network system can determine to select a service provider having a bicycle provider type. On the other hand, if the route includes a segment over a highway or an expressway, the network system can select a service provider having an automobile provider type.

According to embodiments, the network system can determine one or more values (e.g., cost, surcharge, etc.) associated with each of the available items, each of the plurality of entities, and/or the requested service. The one or more values can be dynamically determined based on an estimated amount of supply and/or an estimated amount of demand in the geographic region for each of the available items, each of the plurality of entities, and/or the requested service. For instance, the network system can estimate a likelihood or number of requests for service that may be made at any given time or interval based on a number of active users (e.g., users interacting with user applications) in the given geographic region (or in a sub-region within the given geographic region). The network system can also base the determination on real-time data received from the plurality of entities that indicate, for example, a number of backlogged requests. The network system can also determine the one or more values based on extrapolation, analysis, or machine learning algorithms performed on historical data. For instance, the network system can estimate the likelihood or number of requests for service that may be made based on historical data collected for a specific day and/or time (e.g., amount of requests or interactions with the user applications during a specific time and/or day, such as weekdays between noon and 1 PM, etc.) or based on occurrence of events (e.g., a sporting event such as a football game).

In various aspects, the dynamically determined one or more values can be associated with each item available for selection by the requesting user. In some examples, the network system can determine a dynamic value associated with the service request, separate and apart from the items selected by the user. Such a dynamically determined value can be associated with expedited or high priority processing, handling, and preparation by the entities and/or service providers, thereby resulting in an accelerated service time. Furthermore, the network system can adjust one or more dynamically determined values in exchange for the user's selection of items ahead of the desired service time (e.g., pre-order) or in exchange for the user's acceptance of an alternate service time (e.g., off-peak service time).

In some examples, the network system can create and maintain user profiles that store information regarding users can be utilized by the network system to provide an improved user experience managing the network service. For instance, a user profile can store the corresponding user's preferences and data (e.g., favorite items, usual order times, preset or favorite service locations, allergies, disliked items, etc.) that can be used in improving the user experience in requesting services using the network service. For instance, using user profile information, the network system can determine suggestions regarding available items (e.g., suggested entities, suggested items, suggested item pairings) to the user. In various aspects, the network system can also create and maintain entity profiles that store information regarding entities (e.g., entity location, historical order data, etc.) that can be used by the network system to manage the network service.

According to embodiments, to fulfill a request for a first service (e.g., a delivery service), the network system can leverage a second service (e.g., a transport service, a delivery service). The second service can be a currently-in-progress service or can be a service that is planned or scheduled for a future time. In some examples, the network system can determine that a service provider is in progress of providing the second service to the requesting user. In response, the network system can determine or retrieve a second service duration indicating a duration of time remaining for the second service. The system can also estimate a first service duration related to the first service (e.g., estimated time to fulfill the request for the first service by matching a nearby service provider with the request). The first service duration can be estimated based on respective preparation times associated with one or more items selected by the requesting user for the first service. The network system can select a service mode for the first service based on the first service duration and the second service duration.

For example, the network system can determine that a second service provider is currently in progress of providing a second service for a user to a service location. In response to this determination, the network system can identify a plurality entities and/or a number of available items offered by the plurality of entities based on information related to the first service (e.g., service location, route, service duration, etc.). Content data corresponding to the plurality of entities and/or the number of available items can be transmitted to a user device operated by the user for viewing and selection. The network system can receive a request for a first service from the user device, the request including data regarding the user's selection of one or more selected items from the available items. The network system can select a first service mode and a second service mode for the first service. In response to selecting the first service mode, the network system can identify a first service provider to fulfill the first service. The network system, can determine, for the first service provider, an optimal route that includes route segments to each of a subset of the plurality of entities and a route segment to the service location. In response to selecting the second service mode, the network system can update a route of the second service such that the updated route includes segments to each of a subset of the plurality of entities and a segment to the service location. The network system can transmit data regarding the updated route and/or additional information (e.g., pickup information) to the second service provider.

In certain implementations, the network system can select between the first service mode and the second service mode based on a comparison of the first service duration and the second service duration. For instance, in response to determining that the first service duration is longer (e.g., by a threshold value) than the second service duration, the network system can select the first service mode. In contrast, in response to determining that the second service duration is longer than the first service duration (e.g., by a threshold value), the network system can select the second service mode. In some examples, the determination to select the first service mode and the second service mode can also be based on evaluation of the updated route for the second service. For instance, if updated route represents a significant additional detour compared to the original route (e.g., in terms of distance, time, etc.) the system can select the first service mode for fulfill the request for the first service.

According to embodiments, the requesting user can be prompted for confirmation within a user application to continue with the selection of one or both of the service modes. For example, the dedicated user application for the first service can display a prompt informing the user that the second service mode (e.g., re-routing the second service provider that is scheduled or in-progress of providing the second service) can be selected. The user can select (e.g., by activating a user interface feature within the dedicated user application) to confirm the selection of the second service mode to fulfill the first requested service. The user can also select to reject the selection of the second service mode. If the user rejects the selection of the second service mode, the network system can cancel the selection of the second service mode and continue to fulfill the request for the first service in the first service mode.

In various aspects, the network system can maintain communications with one or more additional systems related to the second service in order to leverage the second service in fulfilling the first service. In some examples, the network system and the one or more additional systems communicate with a single user application executing on the user device. The single user application allows the user to arrange both the first service and the second service. In other examples, the network system communicates with a first user application for requesting the first service and the one or more additional systems communicate with a second user application for requesting the second service. The first user application and the second user application can share data (e.g., locally on the user device or over a network) to facilitate interactions between the first service and the second service (e.g., leveraging the second service in fulfilling a request for the first service, etc.).

According to embodiments, the one or more additional networks can perform one or more steps related to the second service during the process to fulfill the first service by leveraging the second service (e.g., re-routing the second service provider etc.). For instance, the one or more additional systems can determine and update the second service duration (e.g., amount of time remaining for the second service, estimated time of arrival at the service location, etc.). The network system can access real-time data regarding the second service duration by retrieving data from a cache or a database of the one or more additional systems. In addition, the one or more additional systems can update the route for the second service provider and transmit data corresponding to the updated route to a provider device of the second service provider.

Among other benefits, examples described herein improve existing mapping and routing techniques, and technology that connect service providers with requesting users in connection with a network service. Whereas in conventional approaches, requesting users wishing to select items provided by multiple entities must submit separate queries and requests over the network, users interacting with an exemplary network system described herein can submit a single query and request. In response, the network system is configured to select a single service provider to fulfill such a request by utilizing timing information associated with items for selection by requesting users. In this manner, network and computing resources are more efficiently utilized by the network system described herein since resource-intensive processes to identify and select among candidate service providers and routing the selected service provider need only be performed once. The methods described herein have the additional benefit of more efficiently managing service providers and reducing their wait times at entities that provide the items selected by users. In addition, conventional approaches generate routes that are sub-optimal and can result in excessive wait times leading to additional resources (e.g., other service providers) needing to be dispatched by the network system to complete the service request. The network system described herein can avoid such waste of resources and the associated computing resources needed to perform such actions by generating routes for the selected service provider that takes into account timing information, including real-time data, associated with items provided by the entities. As a result, the routes are generated and updated such that the selected service provider arrives at the appropriate times at each entity.

Furthermore, the examples described herein achieve a technical effect of improving user experience in interacting and requesting services through the network service. For example, by associating estimated preparation times with items offered by nearby entities, the network system allows users to select items offered by a plurality of entities for each request for service. In this manner, the user is not restricted or limited to requesting items from a single selected entity for each request for service. In addition, by selecting appropriate service providers and determining optimal routes based at least in part on the preparation times, the network system is able to effectively and efficiently manage resources such as service providers in fulfilling users' requests for service over the geographic region. Some example benefits in this regard include reduced wait times for service providers and increased efficiency.

Additionally, in conventional network services, a requesting user may be scheduled for or in progress of two different services at or around the same time. This may lead to conflicts or undesirable effects. For instance, a first service may require the presence of the requesting user, who may be in progress of a second service. Using conventional network services may result in the first service provider being forced to wait an excessive amount of time for the requesting user to complete the second service. This decreases efficiency and results in waste. Furthermore, the conventional network service cannot leverage existing resources such as in progress or scheduled instances of another service to fulfill requests for service. By leveraging a second in-progress or scheduled service to fulfill the request for service, the network system is able to avoid these shortcomings and improve user experience. For instance, the network system is able to determine an appropriate service mode based on a service duration of the second service. The requesting user can be prompted to confirm to, for example, re-route a second service provider for the second service to fulfill the first service. In doing so, the network system can ensure that the first service is performed in an appropriate manner in view of the service duration of the second service. For example, the network system can optimize the first service such that the first service provider arrives at the service location at an appropriate time in view of the service duration of the second service (e.g., at the same time or shortly after the second service provider arrives at the service location). As another example, the network system can select or suggest a service mode in which the second service provider is re-routed to fulfill the first service in addition to completing the second service. Furthermore, in addition to improving user experience, the network system can also better manage resources such as service providers by, for example, reducing wait times for service providers and increasing efficiency.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Some examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs can drive without any human assistance from within or external to the vehicle. Such vehicles are often required to make advanced determinations regarding how the vehicle behaves given challenging surroundings of the vehicle environment.

System Description

FIG. 1 is a block diagram illustrating an example network system in communication with user devices, service provider devices, and entities. Network system 100 can manage a network service within a given geographic region (e.g., (e.g., a metroplex such as the San Francisco Bay Area). The network system 100 communicates with provider devices 190 operated by service providers 192 and with user devices 195 operated by users 197. Using the network service provided by the network system 100, users 197 can view and select among available items offered by a plurality of entities. Furthermore, users 197 can request a service related to the user's selection of one or more selected items of the available items. The network system 100 can identify one or more service providers 192 to provide the requested service to a service location. In addition, the network system 100 communicates with entities 185 to transmit data related to the user's 197 request for the one or more selected items to the entities 185 and/or receive data regarding status information and the like. As used herein, the user device 195 and the provider device 190 can comprise mobile computing devices (e.g., smartphones, tablet computers, smart watches, etc.), VR or AR headsets, desktop computers, on-board computing systems of vehicles, and the like. In addition, the service provider 192 and provider device 190 can be on-board computing systems of autonomous vehicles.

The network system 100 can include preparation time estimation 105, value engine 110, query processing 115, provider routing and selection engine 120, request processing 125, entity interface 135, user device interface 140, provider device interface 145, and database 150.

The network system 100 can include a user device interface 140 to communicate with user devices 195 over one or more networks 180 via a user application 196. According to examples, a requesting user 197 wishing to utilize the network service can launch or interact with user application 196 on a corresponding user device 195. The user application 196 can submit a query 198 to the network system 100 over network 180. The query 198 can include data regarding a service location. The user device 195 can transmit query 198 automatically in response to the user's launching or activating of the user application 196 on the user device 195. In some examples, the user application 196 can store a default service location such that the query 198 transmitted in response to the user's launching or activating the user application 196 includes data regarding the default service location. The default service location can be the user's 197 home location, work location, or last-used service location. The query 198 can also be submitted in response to a user selection of or interaction with a user interface feature within the user application 196. The user 197 can also provide a service location by entering an address, searching for a nearby point of interest, or selecting a location on an interactive map within the user application 196.

According to embodiments, query processing 115 receives the query 198 and, in response, generates available items 116 corresponding to a plurality of available items that can be selected by the user 197 in association with a service request. The query processing 115 can identify a plurality of nearby entities 185. The query processing 115 can identify nearby entities 185 based on the service location (e.g., entities located within a certain distance from the service location, entities located within a certain estimated time of travel from the service location, etc.) and the current time (or desired service time) (e.g., entities that are currently within their operating hours, etc.).

The query processing 115 can retrieve, from database 150 or an external database, data corresponding to the items offered by each of the plurality of nearby entities 185 (e.g., item data 153). In some examples, the query processing 115 can identify all items offered by the plurality of nearby entities as available items 116 to the requesting user device 195. In other examples, the query processing 115 can identify a sub-set of the offered items as available items 116. The identification of available items 116 from all items offered by the plurality of nearby entities 185 can be based on respective preparation times associated with the items. For instance, the query 198 can include a desired service time entered by the user 197 that indicates a desired time for ordered items to arrive at the service location. The query processing 115 can identify an offered item as an available item 116 based on the determination that the item can be prepared (e.g., as indicated by the preparation time associated with the item) in time to arrive at the service location before or around the desired service time.

The query processing 115 can further identify items offered by the plurality of nearby entities as available items 116 based on factors such as inventory at the nearby entities 185, user preferences and other profile information, and/or information regarding each of the offered items. For instance, the query processing 115 can retrieve (e.g., from database 150 or from the nearby entities 185 (via entity interface 135)) data corresponding to inventory of available raw materials or ingredients at each of the nearby entities 185. The query processing 115 can identify only items for which the nearby entities 185 have sufficient remaining inventory of raw materials as the available items 116. As another example, the query processing 115 can retrieve (e.g., from database 150 or from user device 195) data corresponding to user preferences including, for example, data regarding non-desired items (e.g., food allergies). The user preferences can be stored in database 150 as part of user profiles 156 or as part of user application data on user device 195. As a further example, the query processing 115 can retrieve (e.g., from database 150 or from nearby entities 185) data regarding the offered items such as data corresponding to constraints on service for each offered item (e.g., information indicating that a particular item is unsuitable for travel time of longer than twenty minutes).

According to embodiments, the user device interface 140 transmits data regarding the available items 116 to the requesting user device 195. The data can be transmitted as content data 141 for display on the user device 195 within the user application 196. For instance, the user device interface 140 can include a user content engine to generate the content data 141 based on the available items. The user application 196 can display the available items 116 for viewing and selection by the requesting user 197. In various aspects, content data 141 corresponding to the available items 116 includes value information (e.g., values 111 generated by value engine 110). Accordingly, the requesting user 197 can view value information associated with each of the available items 116 in making his or her selection among the available items 116.

According to embodiments, the request processing 125 receives, from the requesting user device 195 via the user device interface 140, request 199 corresponding to a request for service. The request 199 can include data regarding the requesting user's selection of one or more selected items from the available items 116 in association with the request for service. The request processing 125 can also receive value 111 from the value engine 110 and entity data from the entities 185 (via the entity interface 135). In response to receiving the request 199, the request processing 125 can generate processed requests 128 to each of a sub-set of entities (e.g., those entities 185 providing or offering the one or more items selected by the requesting user 197 in request 199). The processed requests 128 can include information to instruct each of the sub-set of entities to begin preparing the items selected by the requesting user 197. For instance, the processed request 128 to a particular entity 185 can include information such as an item selected by the requesting user 197 (and any options or customizations to the selected item) and any additional information relevant to the request (e.g., time to begin preparations, item or order priority, etc.). In response, the sub-set of entities 185 can prepare the selected items in accordance with the additional information.

In certain examples, the request processing 125 can generate status information 126 based on data received at the entities 185. The status information 126 can be transmitted to the user devices 195 by the user device interface 140 to enable the user devices 195 to display current status of the orders. For instance, a user device 195 can display user interface features to show or graphically represent the progress of a submitted request 199.

According to embodiments, the network system 100 can include value engine 110 for generating values 111 corresponding to the available items and/or selected items. The values 111 can include data components that indicate a value for each of the available items and/or selected items. In certain implementations, the values 111 can be dynamically determined based on real-time data. For instance, values 111 can be dynamically determined based on real-time data corresponding to a number of active users 197 in the given geographic region or near the service location (e.g., within a sub-region of the given geographic region that includes the service location, within a certain distance or radius of the service location, etc.). The number of active users 197 can be determined or estimated by the network system 100 (e.g., by user device interface 140) based on the number of users 197 interacting with user applications 196 near the service location. The value engine 110 can also determine the values 111 based on real-time data such as entity data 186 that indicates, for example, a number of requests received by the entities 185 and/or for a specific item. For instance, values for items offered by a specific entity can be increased to account for a high number of requests received by the entity. As another example, value corresponding to a specific item can also be increased to account for a high number of requests for the specific item. In some examples, the value engine 110 can also determine the values 111 based on real-time data regarding current events (e.g., a sporting event). For instance, values 111 can be increased based on the determination that a popular event is scheduled for a particular time that may led to an increase in the number of request for items.

According to embodiments, the value engine 110 can also determine the values 111 based on analysis of historical data such as historical value data 152. For instance, historical value data 152 can indicate, for a specific day and/or time (e.g., Fridays at 7 P.M.), information relevant to the determination of values 111 (e.g., number of requests by a specific entity and/or for a specific item and/or, total number of requests received by the network system 100, number of active users of the network system 100, etc.). Historical value data 152 can also include historical values (e.g., average or median values on Fridays at 7 P.M.) for each of the available and/or selected items on which the determination of the values 111 can be based. The value engine 110 can also perform analysis, such as regression modeling, extrapolation, and/or machine learning algorithms, of the historical value data 152 to determine the values 111.

According to embodiments, the network system 100 can include preparation time estimation 105 to estimate or determine preparation times 106 associated with items offered by entities. The preparation times 106 can be determined based on historical data such as historical preparation time 151 retrieved from database 150. The historical preparation time 151 can include data corresponding to average or median preparation times associated with each item offered by entities measured over a period of time. For instance, the historical preparation time 151 can indicate that over the past month, the average historical preparation time for a particular item is six minutes. The preparation time estimation 105 can estimate the preparation time 106 associated with the particular item based on the historical average of six minutes. In some examples, the preparation time estimation 105 can determine the preparation time 106 by performing machine learning techniques (e.g., using an artificial neural network), regression algorithms, Markov analysis, and the like on historical data such as historical preparation time 151. According to embodiments, the preparation time estimation 105 can also estimate preparation time 106 based on real-time data, including, for example, entity data 186 received from the entities 185. The entity data 186 can include data corresponding to, for example, pending or received orders at the entity.

According to embodiments, the network system 100 can include a provider routing and selection engine 120 for determining an optimal route for the selected service provider in fulfilling the request for service. In this context, an optimal route can be a route that is optimized based on various parameters and pieces of information available to the network system 100 including, for example, preparation times 106 of the one or more selected items, information regarding the request 199 from the requesting user 197, and the like. For instance, the provider routing and selection engine 120 can optimize the route based on the preparation times of the one or more selected items indicated in the request 199. In this manner, the network system 100 can schedule the times of arrival of the selected service provider at each entity on the route in view of the preparation times of the one or more selected items. For example, based on the preparation times, the provider routing and selection engine 120 can optimize the route such that the selected service provider arrives at the location of an entity at or around the time that a selected item being prepared by the entity is estimated to be ready for pick-up. In this manner, wait times for both the service provider 192 and the requesting user 197 can be minimized. As another example, the provider routing and selection engine 120 can optimize the route by determining an entity order for the route (e.g., order of entities visited by the selected service provider on the route). This determination can also be based on the preparation times associated with the one or more selected items. For example, in response to a request for service for two selected items—a first item offered by a first entity and a second item offered by a second entity—the provider routing and selection engine 120 can determine the route such that the first entity is ordered ahead of the second entity based on based on the preparation times associated with the first and second selected items. In this manner, the wait times for the service provider 192 and the requesting user 197 can be further reduced. In addition, the provider routing and selection engine 120 can dynamically update the route based on real-time data from the entities 185 regarding status of the one or more selected items (e.g., preparation status, etc.). Accordingly, the route for the selected service provider can be dynamically updated to take into account, for example, any delays at the entities 185 in preparing the one or more selected items. Furthermore, the provider routing and selection engine 120 can further optimize the route to minimize the travel distance and/or travel time. For example, the provider routing and selection engine 120 can take into account traffic information to optimize the route to reduce travel distance and/or travel time. The provider routing and selection engine 120 can also be configured to dynamically balance the various factors and parameters being optimized (e.g., travel distance, travel time, service provider wait time, requesting user wait time, item idle time (e.g., time after items is prepared and before being picked up by the selected service provider), etc.) in determining the optimal route. For instance, during a time period of service provider shortage, the provider routing and selection engine 120 can determine the optimal route such that service provider wait time is weighted more heavily in the optimization process.

To determine the optimal route, the provider routing and selection engine 120 can receive information (e.g., provider routing and selection data 154) from the database 150. The provider routing and selection data 154 can include, for example, data regarding preparation times of the one or more selected items stored in the database 150. The provider routing and selection engine 120 can further receive traffic information (e.g., real-time traffic data, predicted traffic information, etc.) over the network (e.g., from a third party) to determine the optimal route. In addition, the provider routing and selection engine 120 can receive request information 127 from the request processing 125 to determine the optimal route. The request information 127 can include information regarding the one or more selected items, the identification and/or locations of the entities offering the one or more selected items, and the like.

According to embodiments, the provider routing and selection engine 120 is further configured to select a service provider from a plurality of service providers 192 to fulfill the requested service. The selection can be based on respective locations of the plurality of service providers 192 with respect to the service location and/or to one or more entities. As such, the provider routing and selection engine can receive provider data 193 transmitted by the provider devices 190 that includes, for example, real-time location information generated by the provider devices. The provider routing and selection engine 120 can select a service provider in close proximity to the service location and/or to one or more entities to, for example, reduce travel time. The provider routing and selection engine 120 can further select a service provider based on a route 121 (or a portion thereof) determined by the provider routing and selection engine 120 for the requested service. For instance, the plurality of service providers 192 can include service providers of a number of provider classes (e.g., automobile, autonomous vehicle, motorcycle, bicycle, on-foot, etc.) and the selection of a service provider can include a determination of an appropriate provider class based on the optimal route. For example, if the optimal route includes route segments on a freeway, highway, or expressway, the provider routing and selection engine 120 can determine the appropriate provider class as an automobile provider class. In contrast, if the route 121 includes route segments within a dense urban zone, the provider routing and selection engine 120 can determine the appropriate provider class as a bicycle or on-foot provider class. Subsequently, the provider routing and selection engine 120 can select a service provider from the plurality of service providers 192 based on the determined provider class. In this manner, the network system 100 can further optimize the fulfillment of the requested service by selecting an appropriate service provider based on the route 121.

In various aspects, the provider routing and selection engine 120 can determine a route 121. The route 121 can be transmitted to the selected service provider to follow in fulfilling the requested service. The route 121 can include route segments to each of the locations of the sub-set of entities (e.g., a first route segment from the current location of the selected service provider to a first one of the sub-set of entities, a second route segment from the first one of the sub-set of entities to a second one of the sub-set of entities, etc.) and a route segment to the service location (e.g., a last route segment from a last one of the sub-set of entities to the service location). In response to certain requests, the route 121 can include two route segments (e.g., a first route segment from the current location of the selected service provider to an entity and a second route segment from the entity to the service location).

In some implementations, the provider routing and selection engine 120 can optimize the route 121 based on preparation times associated with the one or more selected items of the request 199. For example, the provider routing and selection engine 120 can optimize the route 121 to minimize wait times for the selected service provider as well as the requesting user. For example, based on the preparation times, the provider routing and selection engine 120 can determine the optimal route such that the selected service provider arrives at the location of an entity at or around the time that a selected item being prepared by the entity is estimated to be ready for pick-up. The provider routing and selection engine 120 can further optimize the route 121 by determining an order of entities on the route based on the preparation times of the one or more selected items. The network system can additionally optimize the route to reduce travel distance and/or time. In addition, the network system can receive real-time data from entities to update the optimal route. For example, based on real-time data indicating delays at one particular entity, the provider routing and selection engine 120 can update the route 121 to account for the delays (e.g., re-order the order of entities or delaying the route segment to the particular entity experiencing the delays). In this manner, the route 121 can remain optimal based on up-to-date information.

According to embodiments, the provider routing and selection engine 120 can generate service provider information 122 that may be relevant to the selected service provider's fulfillment of the request service, such as expected wait times at each of the entities, confirmation or authentication codes for use at each of the entities, contact information of the requesting user, any additional information relevant to the service location (e.g., a gate code or an intercom number), etc.

According to embodiments, the database 150 of the network system 100 can store information such as user profiles 156, entity profiles 157, and menu item profiles 158. A user profile 156 can store information such as a corresponding user's preferences in items offered by entities (e.g., item preference, favorite entities, favorite item genre, preferred item pairings, disliked items, food allergies, etc.). The user profile 156 can also store the user's most frequently used or favorite service locations (e.g., work, home, etc.). In addition, the user profile 156 can store information regarding the user's past service requests submitted to the network system 100 (e.g., items requested, amount spent, etc.). Using information stored in the user profiles 156, the network system 100 can optimize the corresponding users' 197 experiences. For instance, the network system 100 can determine item or entity suggestions based on information stored in the user profiles 156.

The entity profiles 157 can store information such as an entity's performance record with respect to preparing items in accordance with the items' associated preparation times. For instance, an entity profile 157 may indicate that an entity, based on historical records, has prepared items within their respective preparation times 95% of the time. This information can be transmitted to user device 195 for viewing by a requesting user 197 while the user is viewing available items for selection. In addition, entity profiles 157 can store information such as user reviews and/or ratings of the entities' performance and quality of the items offered by the entities. The menu item profiles 158 can store information related to each item offered by entities 185 in the given geographic region managed by the network system 100. Such information includes, for example, an associated preparation time, ingredient information, and historical value data, etc.

Figure 2:
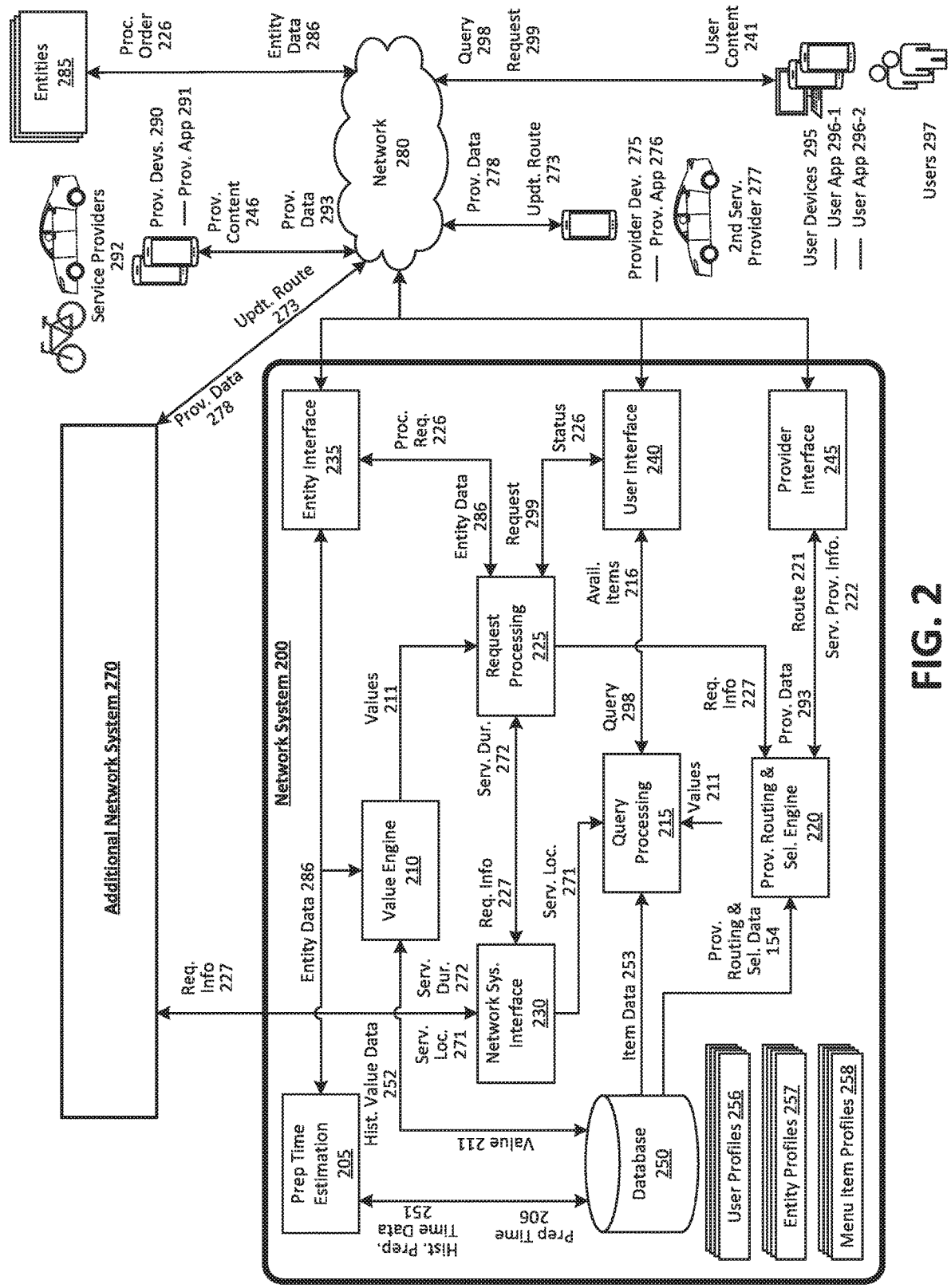
FIG. 2 is a block diagram illustrating another example network system for providing a network service over a given geographic region, in accordance with examples described herein.

FIG. 2 is a block diagram illustrating another example network system for providing a first network service over a given geographic region, in accordance with examples described herein. Similar to network system 100 of FIG. 1, network system 200 can manage the first network service in a given geographic region. In addition, the network system 200 can maintain communications with one or more additional network systems 270. The one or more additional network systems 270 can manage a second network service. The network system 200 communicates with provider devices 290 operated by service providers 292 and with user devices 295 operated by users 297. The user devices 295 can execute two user applications—a first user application 296-1 for interacting with the first network service and a second user application 296-2 for interacting with the second network service. The first user application 296-1 and the second user application 296-2 can share data locally on the user devices 295 (e.g., by accessing shared libraries or databases). In other examples, the user devices 295 can execute a single unified user application that is capable of interacting with both the first network service and the second network service. Using the first network service provided by the network system 200, users 297 can view and select among available items offered by a plurality of entities. Furthermore, users 297 can request a first service related to the user's selection of one or more selected items of the available items through the first user application 296-1.

As described herein, the network system 200 and the one or more additional network systems 270 can communicate and operate together to leverage a scheduled or in progress instance of the second network service for a requesting user to fulfill a request for the first service from the requesting user. In particular, the network system 200 can select to operate in a first service mode or a second service mode in fulfilling the first network service to avoid wait times for service providers and the requesting user as well as to best utilize resources such as service providers providing an in progress or scheduled service. In the first service mode, the network system 200 identifies a first service provider among a plurality of service providers 292 to fulfill the request for first service. In the second service mode, the network system 200 (or the one or more additional network systems 270) re-routes a second service provider 277 scheduled to provide or in progress of providing the second network service for the requesting user such that the second service provider can fulfill the requested first service in addition to the second service.

In addition, the network system 200 can communicate with entities 285 to transmit data related to the user's 297 request for the one or more selected items to the entities 285 and/or receive data regarding status information and the like. As used herein, the user device 295 and the provider device 290 can comprise mobile computing devices (e.g., smartphones, tablet computers, smart watches, etc.), VR or AR headsets, desktop computers, on-board computing systems of vehicles, and the like. In addition, the service provider 292 and provider device 290 can be on-board computing systems of autonomous vehicles.

The network system 200 can include preparation time estimation 205, value engine 210, query processing 215, provider routing and selection engine 220, request processing 225, network system interface 230, entity interface 235, user device interface 240, provider device interface 245, and database 250.

According to embodiments, the network system interface 230 communicates with the one or more additional network systems 270 to receive information related to the second service (e.g., service location 271 and service duration 272). The network system interface 230 can also transmit information related to the first service (e.g., request information 227) to the one or more additional network systems 270.

In various implementations, the one or more additional network systems 270 can determine or estimate information related to the second service such as a service duration 272. The service duration 272 can indicate or represent an estimated amount of time remaining for the second service for the requesting user (e.g., estimated time of arrival at the service location). The service duration 272 can be determined based on traffic information (e.g., real-time traffic data, historical traffic data, predicted traffic patterns, etc.), route information, and the like.

As described herein, the network system 200 can base certain determinations regarding the first service on information provided by the one or more additional network systems 270. For example, query processing 215 can determine a plurality of entities and/or available items 216 offered by the plurality of entities based on the service location 271 of the second service. In addition, the request processing 225 can select the first service mode or the second service mode based on, for example, service duration 272 indicating a time remaining of the second service.

According to embodiments, the request processing 225 can select the first service mode or the second service mode during the query and request processing process. For example, if the network system 200 determines that the requesting user 297 does not have a future or in progress session of the second service, the request processing 225 can determine to proceed with the request 299 in the first service mode. Similarly, the request processing 225 can select the first service mode based on a comparison of the service duration 272 related to the second service and an estimated service duration for the first service. The estimated service duration for the first service can be an estimation of the time the request 299 can be fulfilled in the first service mode. As such, the estimate service duration for the first service can be computed based on the preparation times associated with the one or more selected items indicated in the request 299 and estimated travel times of a selected service provider (e.g., to each of a sub-set of entities that offer the one or more selected items and to the service location). If the estimate service duration for the first service is longer than service duration 272 (e.g., the second service is scheduled to be completed prior to the first service in the first service mode), the request processing 225 can select to proceed with the first service in the first service mode. On the other hand, if the estimated service duration for the first service is shorter than service duration 272 (e.g., the selected service provider will arrive at the service location prior to the service being completed), the request processing 225 can select the second service mode.

In some examples, the network system 200 can generate content data corresponding to a user confirmation to proceed with the selection of the second service mode. In some instances, because the second service mode can involve re-routing the second service provider fulfilling an existing or scheduled service, the requesting user may wish to be notified when the first service proceeds in the second service mode. Accordingly, the network system 200 (e.g., user device interface 240) can generate content corresponding to such a confirmation to be transmitted to the user device 295. The requesting user 297 can confirm the selection of the second service mode through the first user application 296-1.

In the first service mode, the provider routing and selection engine 220 selects a first service provider from a plurality of service providers 292. The provider routing and selection engine 220 can determine a route 221 for the first service provider. The route 221 can include segments to each of a sub-set of the plurality of entities and a segment to the service location. The selection of the first service provider can be based on the determined route 221. The provider routing and selection engine 220 can also generate service provider information 222, which can include information relevant to the first service provider's fulfillment of the request 299 (e.g., anticipated wait times at each of the entities visited on the route, authentication codes to authenticate the service provider with each of the entities, contact information of the requesting user, etc.).

In the second service mode, the network system 200 transmits request information 227 to the one or more additional network systems 270. Based on the request information 227, the one or more additional network systems 270 can generate updated route 273 for the second service provider. The updated route 273 can include segments to each of the sub-set of entities and a segment to the service location 271. In this manner, the network system 200, together with the one or more additional network systems 270, can re-route the second service provider 277 to fulfill the request 299.

Methodology

Figure 3:
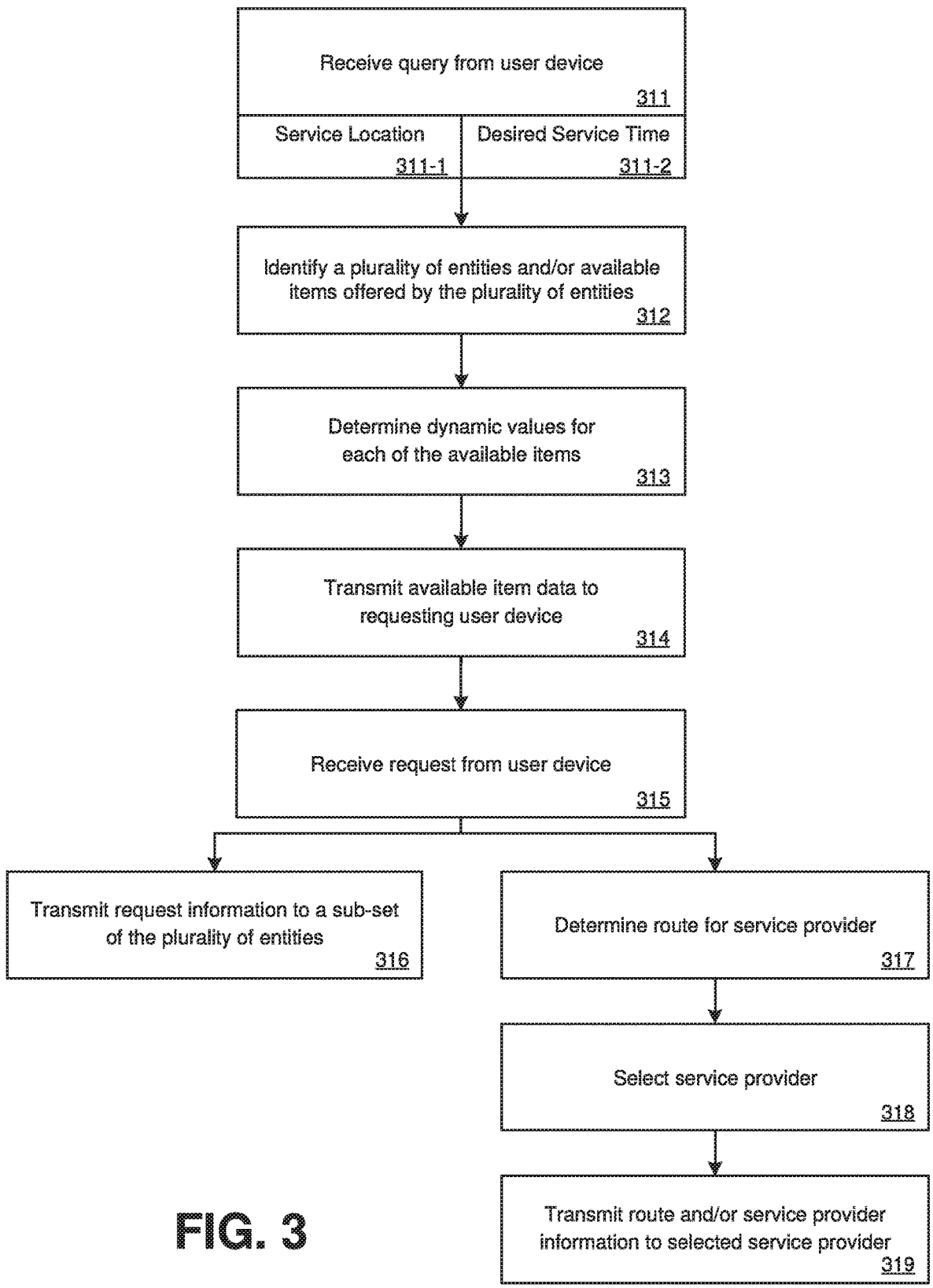
FIG. 3 is a flow chart describing an example method of operating an exemplary network system, according to examples described herein.

FIG. 3 is a flow chart describing an example method of operating an exemplary network system, according to examples described herein. In the below discussion of FIG. 3, reference may be made to features and examples shown and described with respect to FIGS. 1 and 2. Furthermore, the process described with respect to FIG. 3 may be performed by an example network system such as the one shown and described with respect to FIGS. 1 and 2.

Referring to FIG. 3, a network system (e.g., network system 100 of FIG. 1 or network system 200 of FIG. 2) receives a query from a user device (e.g., user device 195 of FIG. 1 or user device 295 of FIG. 2) operated by a user over a network (311). The query can be transmitted by the user device in response to user interactions with a user application executing on the user device (e.g., opening or launching the user application, selecting or activating a user interface feature, etc.). The query received from the user device can include a service location 311-1 and/or a desired service time 311-2. The service location 311-1 can correspond to a location associated with a service (e.g., a location at which a requested service is to be fulfilled). The service location 311-1 can be determined based on geo-location data generated by the user device (e.g., GPS, GLONASS, or Galileo data etc.), entered by the user through the user application (e.g., by entering an address, by searching a name or location, by selecting on an interactive map, etc.), or auto-populated based on historical data pertaining to the user (e.g., a home location, a work location, a favorite location, etc.). The desired service time 311-2 can correspond to a desired time at which the requested service is to be performed. By selecting a desired service time 311-2, a requesting user can schedule a service to be performed for a specific time. The network system can make determinations for various aspects of the requested service for the requesting user based on the service location 311-1 and the desired service time 311-2 (e.g., identifying nearby entities and/or available items in response to the query).

In the examples described herein, the network system can identify a plurality of entities and/or available items offered by the plurality of entities (312). The network system can identify nearby entities based on the service location 311-1. For instance, the network system can identify entities that are within a certain distance from the service location or within a certain estimated time of travel away from the service location. The network system can also identify entities based on the desired service time 311-2. For example, the network system can exclude entities that are not within their operating hours at or around the desired service time.

In certain implementations, the network system can also identify a sub-set of items offered by the plurality of entities as available items. The identification of available items can be based on preparation times associated with the items offered by the plurality of entities. For example, the network system can exclude items that will not be prepared by the entities in time to arrive at the service location at or around the desired service time 311-2. The available items can also be identified based on data from the entities (e.g., inventory data). For instance, the network system can exclude an item for which an entity does not have sufficient inventory. Additionally, the available items can be identified based on preferences of the requesting user (e.g., stored in a user profile). For example, the network system can exclude items for which the requesting user has previously indicated to be excluded from future requests (e.g., disliked items) or items determined to be inappropriate for the requesting user (e.g., due to a food allergy) based on the requesting user's profile.

According to embodiments, the network system can determine dynamic values for each of the available items (313). The values can be dynamically determined in real-time based on one or more of a number of factors including a likelihood or number of requests for service received by the network system at any given time, a number of users interacting with the user application on the users' respective user devices, number of requests received by each entity, historical value data, information related to the weather and/or current events, etc. For instance, during a time period in which the network system receives a large number of requests, values corresponding to the items offered by the plurality of entities can be increased. On the other hand, if the network system receives a low number of requests during another time period, values corresponding to the items offered by the plurality of entities can be decreased. As another example, if one particular entity receives a large number of requests, values corresponding to items offered by that particular entity can be increased. Furthermore, values can be adjusted based on current or anticipated weather conditions (e.g., values can be increased during inclement weather) or current events (e.g., values can be increased before or during a sporting event). In this manner, the network system can optimally determine values for items offered by the plurality of entities based on a variety of relevant factors.

In the examples described herein, the network system can transmit data regarding the available items and/or the plurality of entities to the requesting user device (314). Data transmitted to the requesting user device can include content data for displaying content regarding the available items on the user devices. For example, data transmitted by the network system can cause or enable the user devices to display one or more lists or menus of available items. The requesting user can view and interact with the one or more lists to select items in association with making a service request. The content data can further include data to enable the requesting user device to display the dynamically determined values of each of the available items (e.g., as part of the one or more lists or menus of available items). Furthermore, the content data can include relevant information such as user reviews or ratings of available items and/or each of the plurality of entities, images of the available items, etc. Additionally, the content data can include one or more suggested items for the requesting user based on the requesting user's preferences. For example, the content data can include a pairing suggestion indicating a plurality of items that the requesting user may enjoy at the same time (e.g., a food pairing or a food-drink pairing, etc.).

According to embodiments, the network system can receive a request from the user device (315). The request can include data regarding the user's selection of one or more selected items from the available items for service to the service location 311-1. The request can be generated by the user device in response to the requesting user's interaction with the user application (e.g., using a "Submit" or "Place Order" user interface feature).

In various examples, in response to receiving the request at step 315, the network system transmits request information to a sub-set of the plurality of entities (316). The sub-set of the plurality of entities can be entities that offer the one or more selected items. For instance, for a request for service that includes the user's selection of a first item and a second item, the sub-set of the plurality of entities can include a first entity offering the first item and a second entity offering the second item. The network system can transmit relevant request information to each of the sub-set of entities. For example, the first entity can receive request information (e.g., specific items selected, desired preparation completion time, etc.) regarding the first selected item and the second entity can receive request information regarding the second selected item. In some examples, the request information includes a desired preparation completion time. The desired preparation completion time can be a time for the entity to complete preparation of a corresponding item that is estimated by the network system to ensure that the request is fulfilled in a timely manner (e.g., at or around the desired service time 311-2).

According to embodiments, the network system further determines an optimal route for a service provider in fulfilling the request for service (317). This step may be performed, for example, by service provider routing and selection engine 120 and 220 of FIGS. 1 and 2, respectively. In particular, the optimal routes can be determined based on preparation times associated with the one or more selected items to, for example, minimize wait times for the selected service provider as well as the requesting user. For example, based on the preparation times, the network system can determine the optimal route such that the selected service provider arrives at the location of an entity at or around the time that a selected item being prepared by the entity is estimated to be ready for pick-up. The network system can further optimize the route by determining an order of entities on the route based on the preparation times of the selected items. The network system can additionally optimize the route to reduce travel distance and/or time. In addition, the network system can receive real-time data from entities to update the optimal route. For example, based on real-time data indicating delays at one particular entity, the network system can update the optimal route to account for the delays (e.g., re-order the order of entities or delaying the route segment to the particular entity experiencing the delays). In this manner, the route for the service provider can remain optimal based on up-to-date information.

In various aspects, the network system can select a service provider from a plurality of service providers to fulfill the request for service (318). For instance, the network system can select a service provider located proximately to an entity and/or the service location. Additionally, the network system can select a service provider based on the optimal route. For instance, the network system can select a bicycle service provider based on the optimal route being within a dense urban environment. In contrast, if the optimal route includes one or more segments over a freeway or highway, the network system can select an automobile service provider.

According to embodiments, the network system can transmit data corresponding to the optimal route to the selected service provider (319). The data corresponding to the optimal route can include content data, such as map data to enable or cause a provider device of the selected provider to display route guidance or an interactive map that includes the optimal route. In addition, the network system can transmit service provider information (e.g., service provider information 122 and 222 of FIGS. 1 and 2, respectively) to the provider device. The service provider information 122 can include information useful to the service provider in fulfilling the requested service such as anticipated wait times at each of the entities visited on the route, authentication codes to authenticate the service provider with each of the entities, contact information of the requesting user, etc.

Figure 4:
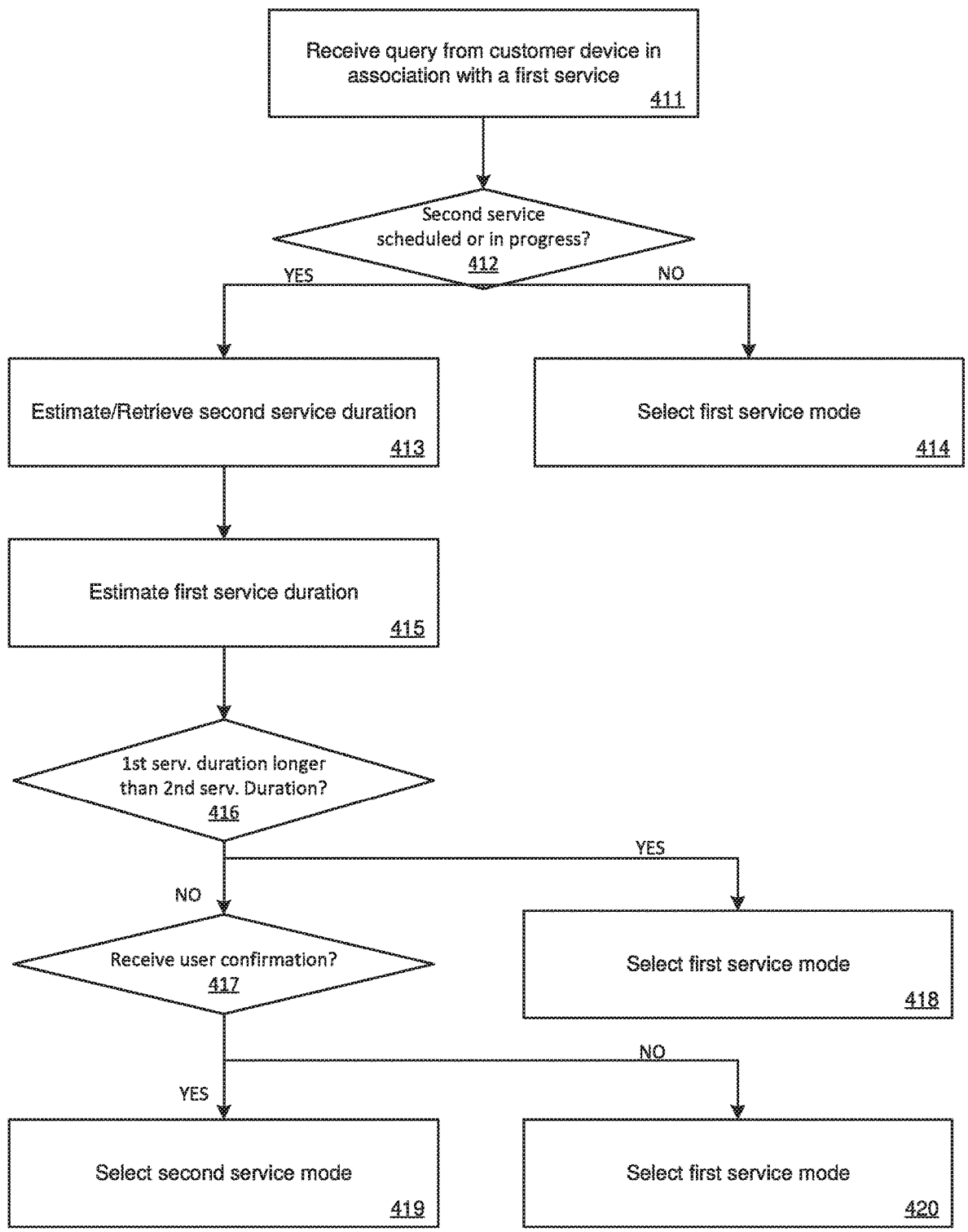
FIG. 4 is a flow chart describing another example method of operating an exemplary network system, according to examples described herein.

FIG. 4 is a flow chart describing another example method of operating an exemplary network system, according to examples described herein. In the below discussion of FIG. 4, reference may be made to features and examples shown and described with respect to FIGS. 1 and 2. Furthermore, the process described with respect to FIG. 4 may be performed by an example network system such as the one shown and described with respect to FIGS. 1 and 2.

Referring to FIG. 4, a network system (e.g., network system 100 of FIG. 1 or network system 200 of FIG. 2) receives a query (e.g., query 198 and 298 of FIGS. 1 and 2, respectively) in association with a first network service from a user device (e.g., user device 195 of FIG. 1 or user device 295 of FIG. 2) operated by a requesting user over a network (411).

In certain implementations, the network system can determine whether a second service provider is scheduled to provide or in progress of providing a second network service to the requesting user to a service location (412). In some examples, the network system can make this determination based on the received query, which can indicate that the second service is in progress (or scheduled to be provided) for the requesting user. For instance, a first user application for the first service on the requesting user device may access data shared by or communicate locally (e.g., within the user device) with a second user application for the second service to receive data indicating that the second service is in progress or scheduled for the requesting user. In response, the first user application can generate the query that includes an indication regarding the second service. In other examples, one user application is used to request and interact with the first service and the second service. In addition to or as an alternative, the network system can communicate with one or more additional systems that manage the second service to determine whether the second service is in progress or scheduled for the requesting user. The network system can maintain communications with the one or more additional systems to leverage the second service in fulfilling the requested first service. In other implementations, a single network system can manage both the first and the second services.

According to embodiments, the network system can make a number of additional determinations based on the received query and/or information related to the second service (if in progress or if scheduled). For example, the received query can include information regarding a service location. The service location can be related to the second service or may be selected or entered by the requesting user for the first service. Alternatively, the network system can communicate with the one or more additional systems to determine the service location of the second service. Based on the service location, the network system can identify a plurality of nearby entities and/or available items offered by the plurality of entities. Furthermore, the network system can dynamically determine a value for each of the available items based on a number of parameters. The network system can transmit data (e.g., content data) to the user device of the requesting user that corresponds to the available items, the plurality of entities, and/or the determined values for the available items. Based on the received data, the user device can display one or more menus or lists of available items for viewing and selection by the requesting user. The user device can transmit a request that includes the requesting user's selection of one or more selected items from the available items to the network system.

According to embodiments, the network system can select a first service mode for the first service in response to determining that no second service is scheduled or is in progress (414). In the examples described herein, the network system can select a first service mode or a second service mode. In the first service mode, the network system determines a route, selects a first service provider from a plurality of service providers, and transmits the route and other information to the first service provider to enable the first service provider to fulfill the requested first service. In the second service mode, the network system can leverage the scheduled or in-progress second service to fulfill the requested first service. In the second service mode, the network system (or a second system for managing the second service) can update a route of the second service provider. The updated route includes segments to one or more entities and a segment to the service location. The network system (or the second system) can transmit the updated route and other information to the second service provider to fulfill the requested first service.

In certain implementations, the network system can estimate a first service duration based on respective preparation times associated with the one or more selected items (415). The first service duration can indicate an estimated amount of time to fulfill the first service in the first service mode. Thus, the first service duration can include the preparation times of the one or more selected items indicated in the request for the first service, travel times of the first service provider, etc. The first service duration can be further estimated based on current or predicted traffic conditions.

The network system can compare the first service duration with the second service duration (416). If the first service duration is longer than the first service duration (e.g., a selected first service provider is estimated to arrive at the service location after the second service provider and/or the requesting user), the network system can select the first service mode (418). In contrast, if the first service duration is shorter than the second service duration (e.g., a selected first service provider is estimated to arrive at the service location before the second service provider and/or the requesting user), the network system can transmit data corresponding to a prompt for a user confirmation to the user device of the requesting user (417). The user confirmation can be a confirmation regarding the selection of the second service mode (e.g., re-routing of the second service provider, etc.). If a confirmation is received, the network system can select the second service mode (419). If a confirmation is not received, the network system can default to the first service mode (420).

In various aspects, if the network system selects the first service mode at step 420, the network system can optimize the route and/or information for the selected first service provider to delay the first service provider's arrival at the service location (e.g., to approximately the same time or after the arrival of the second service provider and/or the requesting user at the service location).

User Device

Figure 5:
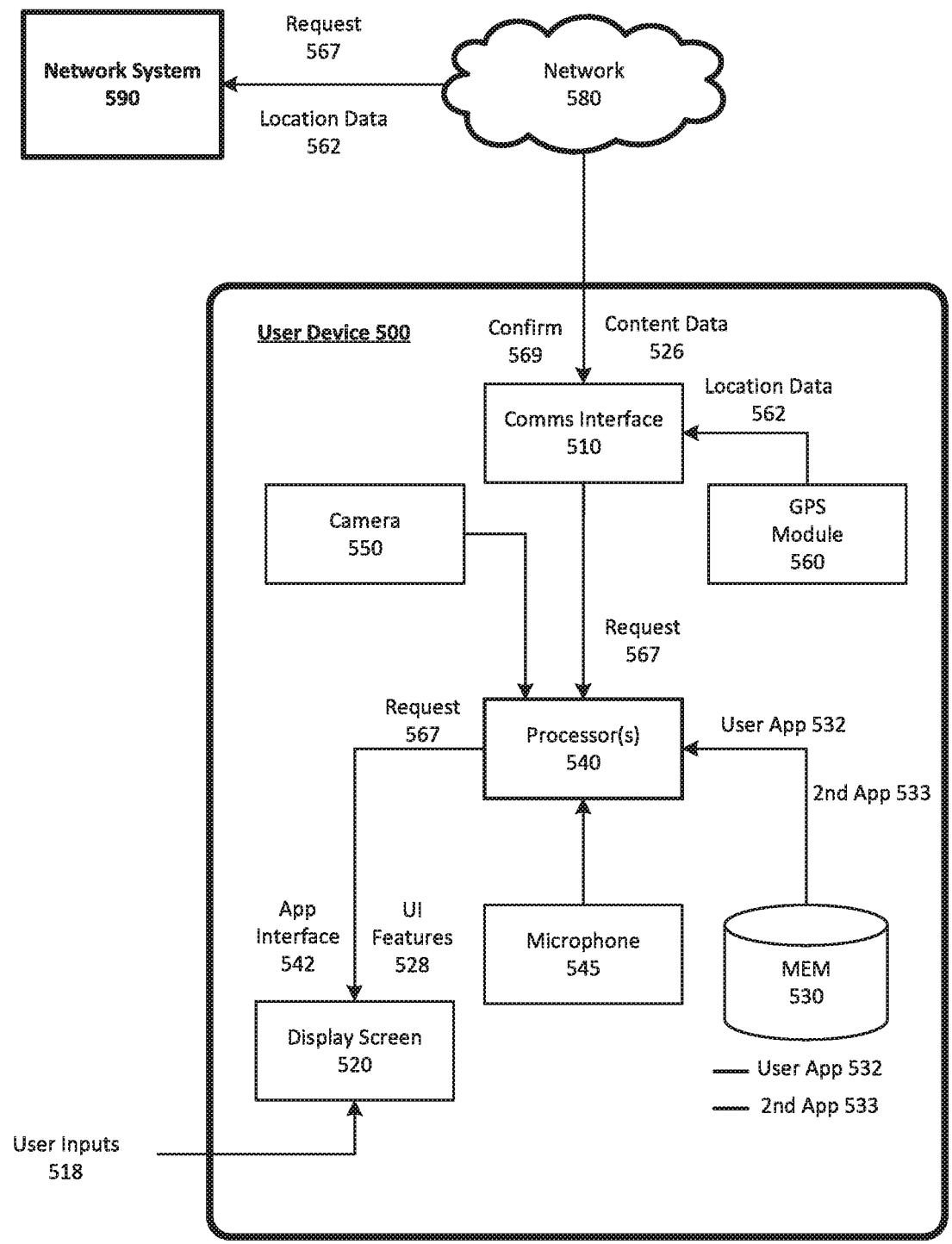
FIG. 5 is a block diagram illustrating an example user device executing a designated user application for communicating with the network service, according to examples described herein.

FIG. 5 is a block diagram illustrating an example user device executing and operating a designated user application for communicating with a network service, according to examples described herein. In many implementations, the user device 500 can comprise a mobile computing device, such as a smartphone, tablet computer, laptop computer, VR or AR headset device, and the like. As such, the user device 500 can include typical telephony features such as a microphone 545, a camera 550, and a communication interface 510 to communicate with external entities using any number of wireless communication protocols. In certain aspects, the user device 500 can store a designated application (e.g., a user app 532) in a local memory 530. In variations, the memory 530 can store additional applications executable by one or more processors 540 of the user device 500, enabling access and interaction with one or more host servers over one or more networks 580.

In response to a user input 518, the user app 532 can be executed by a processor 540, which can cause an app interface 542 to be generated on a display screen 520 of the user device 500. The app interface 542 can enable the user to, for example, view available items offered by nearby entities. In various implementations, the app interface 542 can further enable the user to enter or select a service location (e.g., by entering an address, performing a search, or selecting on an interactive map). Furthermore, the app interface 542 can display dynamically determined values associated with the available items. The user can generate a request 567 via user inputs 518 provided on the app interface 542. For example, the user can select one or more items from the available items in requesting the network service. In some examples, the app interface 542 can display one or more suggested or recommended items that are identified by the network system based on information specific to the user (e.g., user profile information).

As provided herein, the user application 532 can further enable a communication link with a network system 590 over the network 580, such as the network system 100 as shown and described with respect to FIG. 1. The processor 540 can generate user interface features 528 (e.g., map, request status, content cards, etc.) using content data 526 received from the network system 590 over network 580. Furthermore, as discussed herein, the user application 532 can enable the network system 590 to cause the generated user interface 528 to be displayed on the application interface 542.

The processor 540 can transmit the requests 567 via a communications interface 510 to the backend network system 590 over a network 580. In response, the user device 500 can receive a confirmation 569 from the network system 590 indicating the selected service provider that will service the request 567. In various examples, the user device 500 can further include a GPS module 560, which can provide location data 562 indicating the current location of the requesting user to the network system 590 to, for example, establish the service location.

According to embodiments, the app interface 542 can further display user interface features indicating or representing a current status of the request for service. For instance, the app interface 542 can display a progress bar indicating the current status of the user's request. The app interface 542 can also display useful information such as an estimated time of arrival of the selected service provider at the service location. In addition, the user can enter, via the app interface 542, information that may be relevant to the selected service provider such as a building entry access code, an intercom number or code, a contact phone number of the user, a cross-street etc.

In certain implementations, the local memory 530 can further store a second app 533 used to submit requests for a second service. The processor 540 is configured to execute instructions corresponding to the second app 533. The user app 532 and second app 533 can share data within the local memory 530 to exchange information related to the network service and the second service.

Service Provider Device

Figure 6:
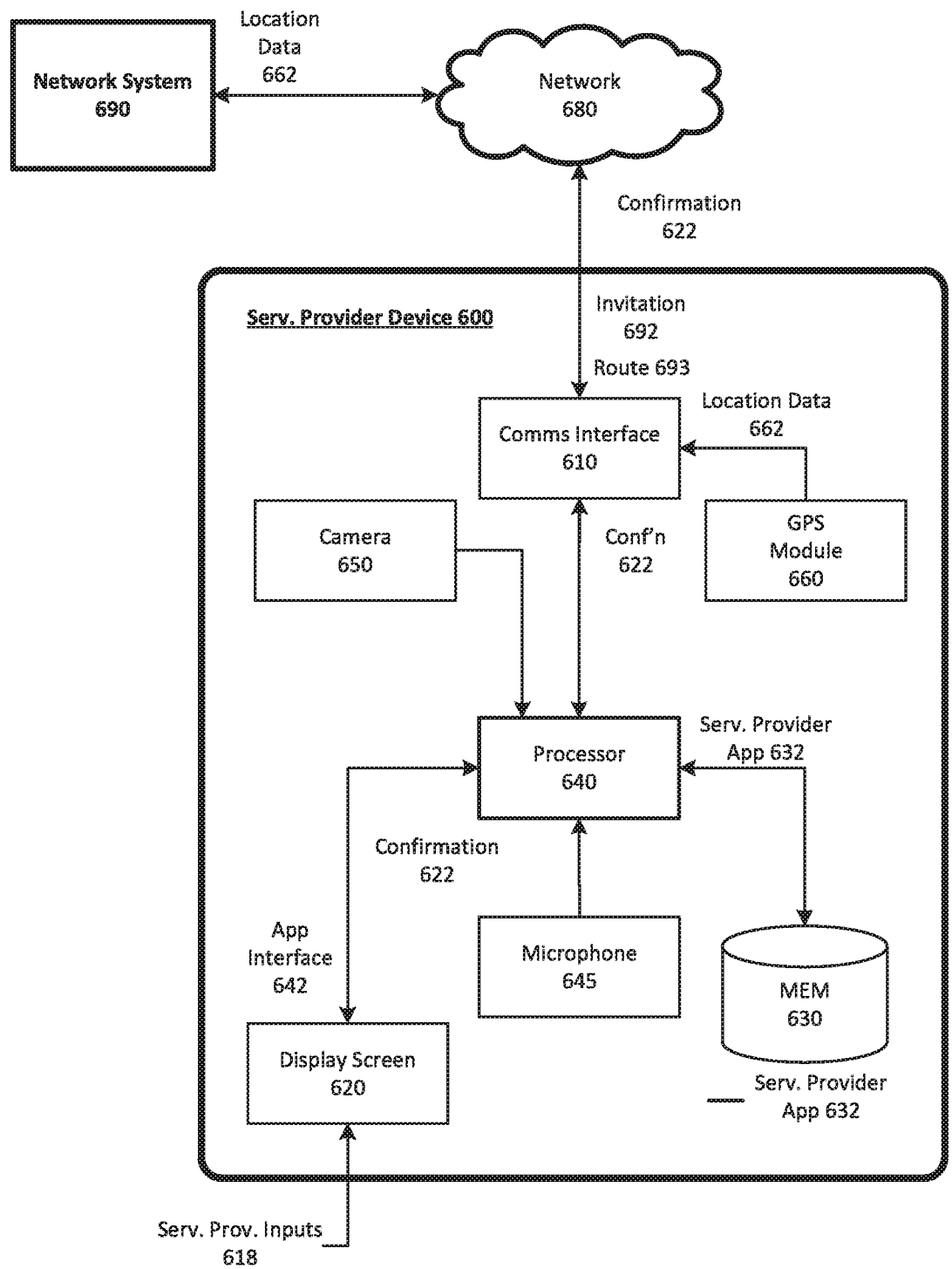
FIG. 6 is a block diagram illustrating an example provider device executing a designated service provider application for communicating with the service, according to examples described herein.

FIG. 6 is a block diagram illustrating an example service provider device executing and operating a designated service provider application for communicating with a network service, according to examples described herein. In many implementations, the service provider device 600 can comprise a mobile computing device, such as a smartphone, tablet computer, laptop computer, VR or AR headset device, and the like. As such, the service provider device 600 can include typical telephony features such as a microphone 645, a camera 650, and a communication interface 610 to communicate with external entities using any number of wireless communication protocols. The service provider device 600 can store a designated application (e.g., a service provider app 632) in a local memory 630. In response to a service provider input 618, the service provider app 632 can be executed by a processor 640, which can cause an app interface 642 to be generated on a display screen 620 of the service provider device 600. The app interface 642 can enable the service provider to, for example, accept or reject invitations 692 in order to service requests throughout a given region.

In various examples, the service provider device 600 can include a GPS module 660, which can provide location data 662 indicating the current location of the service provider to the network system 690 over a network 680. Thus, the network system 690 can utilize the current location 662 of the service provider to determine whether the service provider is optimally located to service a particular request. If the service provider is optimal to service the request, the network system 690 can transmit an invitation 692 to the service provider device 600 over the network 680. The invitation 692 can be displayed on the app interface 642, and can be accepted or declined by the service provider. If the service provider accepts the invitation 692, then the service provider can provide a service provider input 618 on the displayed app interface 642 to provide a confirmation 622 to the network system 690 indicating that the service provider will follow a route 693 received from the network system 690 to fulfill the requested service.

Hardware Diagram

Figure 7:
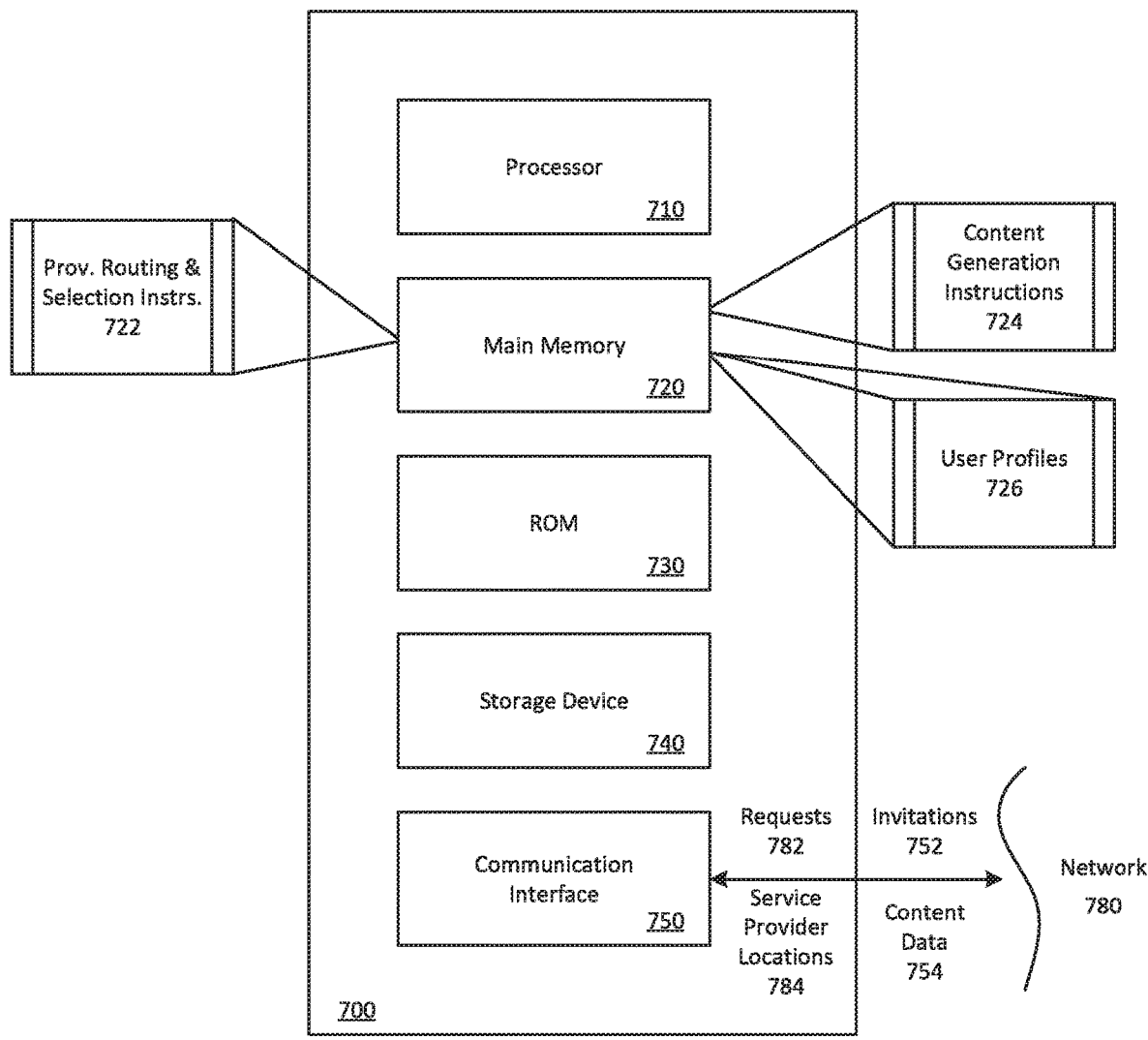
FIG. 7 is a block diagram illustrating a computer system upon which examples described herein may be implemented.

FIG. 7 is a block diagram that illustrates a computer system upon which examples described herein may be implemented. A computer system 700 can be implemented on, for example, a server or combination of servers. For example, the computer system 700 may be implemented as part of a network service, such as described in FIGS. 1 through 6. In the context of FIGS. 1 and 2, the network systems 100 and 200 may be implemented using a computer system 700 such as described by FIG. 7. The network systems 100 and 200 may also be implemented using a combination of multiple computer systems as described in connection with FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with one or more networks 780 (e.g., cellular network) through use of the network link (wireless or wired). Using the network link, the computer system 700 can communicate with one or more computing devices, one or more servers, one or more databases, and/or one or more self-driving vehicles. In accordance with examples, the computer system 700 receives requests 782 from mobile computing devices of individual users. The executable instructions stored in the memory 730 can include provider routing and selection instructions 722, which the processor 710 executes to determine an optimal route and select a service provider to service the request 782.

The executable instructions stored in the memory 720 can also include content generation instructions 724, which enable the computer system 700 to access user profiles 726 and other user information in order to select and/or generate user content 754 for display on the user devices. As described throughout, user content 754 can be generated based on information pertaining to the state of the request (e.g., status information). By way of example, the instructions and data stored in the memory 720 can be executed by the processor 710 to implement an example network system 100 of FIG. 1. In performing the operations, the processor 710 can receive requests 782 and service provider locations 784, and submit invitation messages 752 to facilitate the servicing of the requests 782. The processor 710 is configured with software and/or other logic to perform one or more processes, steps and other functions described with implementations, such as described by FIGS. 1 to 4, and elsewhere in the present application.

Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network system comprising:
one or more processors;
one or more memory resources storing instructions that, when executed by the one or more processors, cause the network system to:
in response to receiving, over a network from a user device of a user, a query for a first service, determine that a service provider is in progress of providing or scheduled to provide a second service for the user;
cause the user device to present a first user interface displaying a plurality of entities for selection by the user in connection with the first service, the plurality of entities being identified based on a set of information associated with the second service that is in progress or scheduled for the user;
in response to receiving a request for the first service, determine, based on respective service parameters estimated for the first service and the second service, whether to select the service provider that is in progress of providing or scheduled to provide the second service to fulfill the request for the first service; and
in response to determining to select the service provider that is in progress of providing or scheduled to provide the second service for the user to fulfill the request for the first service, cause the user device to present a second user interface for confirming the selection of the service provider to fulfill the request for the first service.

2. The network system of claim 1, wherein the request for the first service indicates one or more items selected by the user for delivery, the one or more selected items being prepared by a first entity of the plurality of entities.

3. The network system of claim 2, wherein the respective service parameters estimated for the first service and the second service include a service parameter corresponding to an estimated time of preparation of the one or more selected items by the first entity.

4. The network system of claim 2, wherein the respective service parameters estimated for the first service and the second service include a service parameter corresponding to an estimated time of arrival of the user at a service location associated with the second service.

5. The network system of claim 2, wherein determining whether to select the service provider that is in progress of providing or scheduled to provide the second service to fulfill the request for the first service is based further on comparing an updated route determined for the service provider with an original route for the service provider in providing the second service, wherein the updated route includes a first route segment to a location of the first entity and a second route segment to a service location associated with the second service.

6. The network system of claim 1, wherein the set of information associated with the second service that is in progress or scheduled for the user comprises a service location associated with the second service.

7. The network system of claim 1, wherein the set of information associated with the second service that is in progress or scheduled for the user comprises a service route of the service provider in providing the second service.

8. The network system of claim 1, wherein the plurality of entities is identified based further on a current time or a desired service time indicated by query for the first service.

9. The network system of claim 1, wherein the first service corresponds to a delivery service for one or more items and the second service corresponds to a transport service.

10. The network system of claim 1, wherein the first service and the second service both correspond to a delivery service for one or more items.

11. The network system of claim 1, wherein the executed instructions further cause the network system to:
in response to receiving a user input provided via the second user interface confirming the selection of the service provider that is in progress of providing or scheduled to provide the second service for the user to fulfill the request for the first service, cause a provider device of the service provider to display a route for providing the first service and the second service for the user.

12. The network system of claim 11, wherein the route including a first route segment to a first entity associated with the first service and a second route segment to a service location associated with the second service.

13. The network system of claim 1, wherein the executed instructions further cause the network system to:
in response to (i) determining to not select the service provider that is in progress of providing or scheduled to provide the second service for the user to fulfill the request for the first service, or (ii) receiving a user input provided via the second user interface declining the selection of the service provider that is in progress of providing or scheduled to provide the second service for the user to fulfill the request for the first service, identify a second service provider to fulfill the request for the first service.

14. The network system of claim 1, wherein determining whether to select the service provider that is in progress of providing or scheduled to fulfill the request for the second service is based further on a location of a first entity of the plurality of entities selected by the user to prepare one or more items in association with the first service.

15. A computer-implemented method, comprising:
in response to receiving, over a network from a user device of a user, a query for a first service, determining that a service provider is in progress of providing or scheduled to provide a second service for the user;
causing the user device to present a first user interface displaying a plurality of entities for selection by the user in connection with the first service, the plurality of entities being identified based on a set of information associated with the second service that is in progress or scheduled for the user;
in response to receiving a request for the first service, determining, based on respective service parameters estimated for the first service and the second service, whether to select the service provider that is in progress of providing or scheduled to provide the second service to fulfill the request for the first service; and
in response to determining to select the service provider that is in progress of providing or scheduled to provide the second service for the user to fulfill the request for the first service, causing the user device to present a second user interface for confirming the selection of the service provider to fulfill the request for the first service.

16. The computer-implemented method of claim 15:
wherein the request for the first service indicates one or more items selected by the user for delivery, the one or more selected items being prepared by a first entity of the plurality of entities; and wherein the respective service parameters estimated for the first service and the second service include: (i) a first service parameter corresponding to an estimated time of preparation of the one or more selected items by the first entity, and (ii) a second service parameter corresponding to an estimated time of arrival of the user at a service location associated with the second service.

17. The computer-implemented method of claim 15, further comprising:

in response to receiving a user input provided via the second user interface confirming the selection of the service provider that is in progress of providing or scheduled to provide the second service for the user to fulfill the request for the first service, cause a provider device of the service provider to display a route for providing the first service and the second service for the user, the route including a first route segment to a first entity associated with the first service and a second route segment to a service location associated with the second service.

18. The computer-implemented method of claim 15, wherein the first service corresponds to a delivery service for one or more items and the second service corresponds to a transport service or the delivery service for one or more items.

19. The computer-implemented method of claim 15, wherein the set of information associated with the second service that is in progress or scheduled for the user includes one or more of: (i) a service location associated with the second service, or (ii) a service route of the service provider in providing the second service.

20. A non-transitory computer-readable medium storing instructions that, when executed by one or more processors of a network system, cause the network system to:

in response to receiving, over a network from a user device of a user, a query for a first service, determine that a service provider is in progress of providing or scheduled to provide a second service for the user;

cause the user device to present a first user interface displaying a plurality of entities for selection by the user in connection with the first service, the plurality of entities being identified based on a set of information associated with the second service that is in progress or scheduled for the user;

in response to receiving a request for the first service, determine, based on respective service parameters estimated for the first service and the second service, whether to select the service provider that is in progress of providing or scheduled to provide the second service to fulfill the request for the first service; and in response to determining to select the service provider that is in progress of providing or scheduled to provide the second service for the user to fulfill the request for the first service, cause the user device to present a second user interface for confirming the selection of the service provider to fulfill the request for the first service.

* * * * *